United States Patent [19]
Fujiwara et al.

[11] Patent Number: 5,203,423
[45] Date of Patent: Apr. 20, 1993

[54] VEHICLE CONSTANT-SPEED CRUISING DEVICE

[75] Inventors: Yasuhiro Fujiwara; Kazuyori Katayama, both of Hyogo, Japan

[73] Assignee: Mitsubishi Denki K.K., Tokyo, Japan

[21] Appl. No.: 857,663

[22] Filed: Mar. 26, 1992

[30] Foreign Application Priority Data

Mar. 27, 1991 [JP] Japan .................................. 3-062263

[51] Int. Cl.$^5$ ............................................. B60K 31/00
[52] U.S. Cl. ............................... 180/179; 364/426.01; 123/350
[58] Field of Search ............... 180/176, 177, 178, 179; 123/352, 360, 351, 349, 350; 364/426.01, 424.01, 565, 566, 440, 431.07

[56] References Cited

U.S. PATENT DOCUMENTS

| | | | |
|---|---|---|---|
| 4,725,969 | 2/1988 | Onogi et al. | 180/179 |
| 5,085,287 | 2/1992 | Utsumi & Katayama | 180/179 |

FOREIGN PATENT DOCUMENTS

| | | | |
|---|---|---|---|
| 58-39311 | 3/1983 | Japan . | |
| 1-249532 | 10/1989 | Japan . | |
| 2-120148 | 5/1990 | Japan . | |
| 2-124329 | 5/1990 | Japan . | |
| 0021526 | 1/1991 | Japan | 180/178 |

*Primary Examiner*—Richard M. Camby
*Attorney, Agent, or Firm*—Sughrue, Mion, Zinn, Macpeak & Seas

[57] ABSTRACT

A vehicle constant-speed cruising device, in which, with respect to the pulse width of a pulse signal for an actuator adapted to operate an engine throttle valve, acceleration and deceleration signals given during a predetermined past period of time are stored, to estimate cable-layout hysteresis and correct it. Thereby, the vehicle speed is improved in maintenance and in convergence, thus making it comfortable to ride in the vehicle.

7 Claims, 3 Drawing Sheets

VEHICLE CONSTANT-SPEED CRUISING DEVICE

BACKGROUND OF THE INVENTION

This invention relates to a vehicle constant-speed cruising device.

A vehicle constant-speed cruising device has been disclosed by Japanese Patent Publication Sho-58-39311 (1983). In such a device, when a vehicle is running at a constant speed that is desired to drive the vehicle, that speed is set as a target speed. Thereafter, the vehicle is controlled to run at the target speed. The vehicle speed is controlled as follows. A difference signal between the target speed signal and a traveling speed signal is amplified by a predetermined gain. And, an acceleration signal is also amplified by a predetermined gain. Then, the two amplified signals, the difference signal and the acceleration signal, are calculated to obtain a throttle valve driving signal The signal thus obtained is applied to an actuator, to cause the travel speed to reach the target speed.

In the above-described conventional device, because of the cable-layout hysteresis of the vehicle, the driving amount of the throttle valve is varied whether a signal applied to the actuator is the acceleration or deceleration. That is, since the throttle valve and the actuator for driving the throttle valve, such as an electric actuator or a pressure actuator, are mechanically connected by a wire cable, a force to open the throttle valve is required larger than a force to close the throttle valve due to a return spring of the throttle valve, friction of the wire cable, or the like. Thus, the cable-layout hysteresis is caused. Therefore, it is difficult to maintain the vehicle speed at constant. And, it is difficult to rapidly converge the vehicle speed at the target speed.

SUMMARY OF THE INVENTION

Accordingly, an object of this invention is to eliminate the above-described difficulties accompanying a conventional vehicle constant-speed cruising device. More specifically, an object of the invention is to provide a vehicle constant-speed cruising device with which the vehicle is comfortable to ride in.

According to the present invention, a vehicle constant-speed cruising device comprises: an output signal storing unit for receiving an output from a pulse width calculating unit and for storing acceleration and deceleration signals given during a predetermined past period of time; and a cable-layout hysteresis correcting unit for receiving the outputs of the pulse width calculating unit and the output signal storing unit and for subjecting the output of the pulse width calculating unit to cable-layout hysteresis correction.

In the device according to the invention, the acceleration and deceleration signals given during a predetermined past period of time are stored according to the output of the pulse width calculating unit, and on the basis of the acceleration and deceleration signals thus stored, the output of the pulse width calculating unit is subjected to cable-layout hysteresis correction.

DESCRIPTION OF THE PREFERRED EMBODIMENT

An embodiment of the invention will be described with reference to the accompanying drawings.

Figure 1:
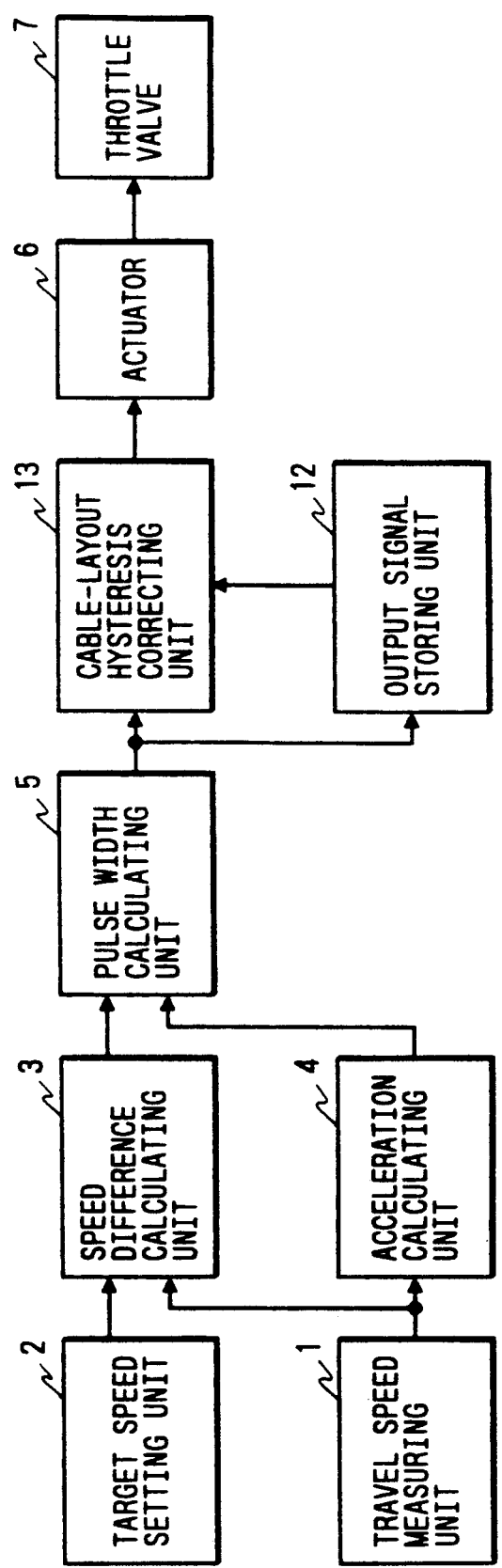
FIG. 1 is a block diagram showing the arrangement of a vehicle constant-speed cruising device according to this invention.

FIG. 1 is a block diagram showing the arrangement of a vehicle constant-speed cruising device according to the embodiment of the invention. In FIG. 1, reference numeral 1 designates travel speed measuring unit for measuring the travel speed of the vehicle; 2, target speed setting unit for setting a target speed; 3, speed difference calculating unit for calculating a speed difference between the target speed and the travel speed; 4, acceleration calculating unit for calculating an acceleration of the vehicle based on the travel speed of the vehicle; 5, pulse width calculating unit for calculating a pulse width of a pulse signal having a predetermined period according to the speed difference signal and the acceleration signal; and 12, output signal storing unit for receiving a pulse signal from the pulse width calculating unit and for storing acceleration and deceleration signals given during a predetermined past period of time.

Further in FIG. 1, reference numeral 13 designates cable-layout hysteresis correcting unit for receiving signals from the output signal storing unit 12 and the pulse width calculating unit 5 to estimate a cable-layout hysteresis thereby to suitably correct an output of an actuator; and 6, an actuator for controlling the operation (opening and closing) of a throttle valve 7 of an engine in response to the output of the cable-layout hysteresis correcting unit 13.

Figure 2:
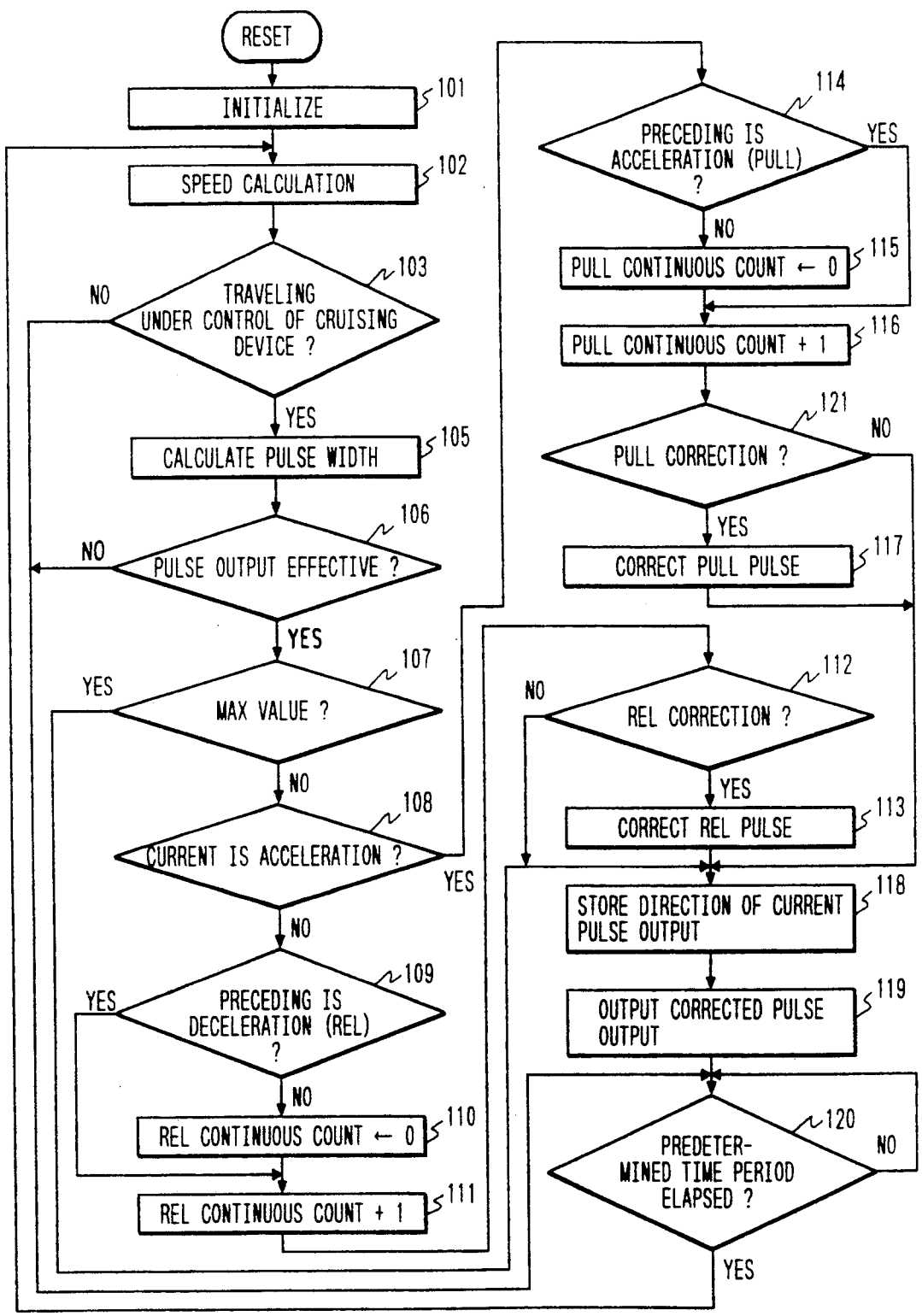
FIG. 2 is a flow chart for a description of the operation of the device according to the invention.

The operation of the device thus organized will be described with reference to a flow chart shown in FIG. 2.

When the power switch is turned on, in Step 101 all the ports, memories, and the like are initialized. Thereafter, in Step 102, the travel speed measuring unit 1 is operated to calculate a travel speed by using the period of a vehicle input pulse. Step 102, Step 103, and so on form a loop which is executed every predetermined period of time which is controlled by Step 120 of time wait. Further, in Step 102, an acceleration is calculated from a vehicle travel speed, and the signs (which indicate acceleration or deceleration) of a predetermined number of past accelerations are stored, and the old data are erased. Furthermore, in Step 102, the difference between a set target speed and the measured travel speed is calculated.

In Step 103, it is determined whether or not the vehicle is travelling under the control of the constant-speed cruising device. If it is not, Step 120 is effected. When it is determined that the vehicle is traveling at a constant speed, Step 105 is effected. In Step 105, a pulse width for correction of the travel speed is calculated from the gain, speed difference, and acceleration. In Step 106, it is determined whether or not the pulse output of the pulse width calculating unit 5 is effective; that is, it is determined whether or not the pulse width has a predetermined value or more. When it is determined that the pulse width has the predetermined value or more, Step 107 is effected to determine whether or not the pulse output is a maximum value. When it is not the maximum value (being too large), Steps 108, 109 and so forth are effected to perform a cable-layout hysteresis correction.

In Steps 108, 109 and so forth, the output directions of the preceding pulses outputs stored in the output signal storing unit 12 and the current pulses output are monitored, and, accordingly, an acceleration (PULL) direction counter or a deceleration (REL) direction counter are counted up. That is, in Step 108, it is determined whether or not the direction of the current pulse is of acceleration. When it is of acceleration, Step 114 is effected to determine whether or not the preceding output is of acceleration. When the preceding output is not of acceleration, Step 115 is effected to set the acceleration continuous output count to zero; and when the preceding output is of acceleration, Step 116 is effected to add one (+1) to the acceleration continuous output count.

When, in Step 108, the direction of the current pulse is not of acceleration, Step 109 is effected. In Step 109, it is determined whether or not the direction of the preceding output is of deceleration. When it is of deceleration, Step 111 is effected to add one (+1) to the deceleration continuous output count; and when it is of acceleration, Step 110 is effected to set the deceleration continuous output count to zero (0). That is, when the output is inverted after the signals which are equal in direction are outputted n times, the cable-layout hysteresis occurs. Therefore, a deceleration direction hysteresis correction and an acceleration direction hysteresis correction are determined in Steps 112 and 121, respectively, and such correction is applied to the pulse output in Steps 113 and 117, so as to cancel the cable-layout hysteresis, to obtain a correct pulse output.

In Step 118, the direction of the current pulse output is stored. In Step 119, the corrected pulse width output is applied to the actuator 6. In response to the output, the actuator 6 operates (open and close) the throttle valve 7 to control the speed of the vehicle.

Figure 3:
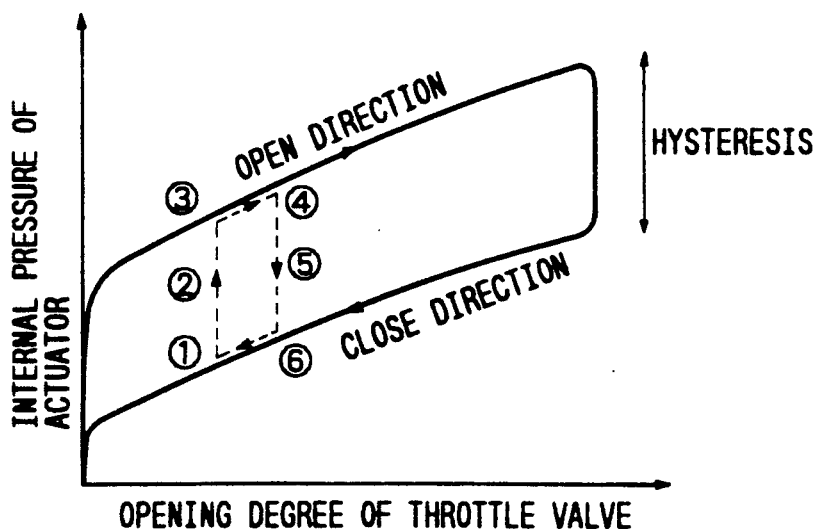
FIG. 3 is a graphical representation indicating actuator pressure with throttle degree-of-opening.
Figure 4:
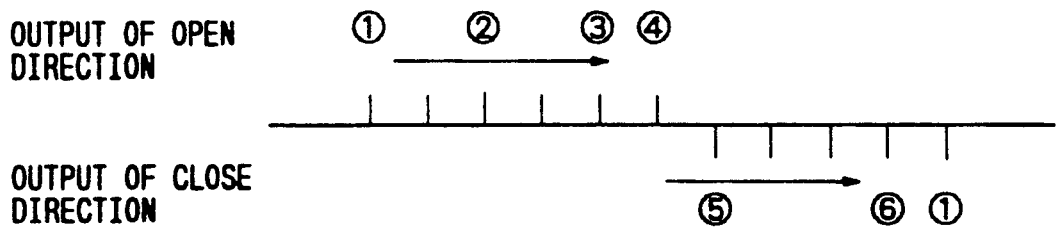
FIG. 4 is an explanatory diagram for a description of the operation of a throttle valve in the conventional art.
Figure 5:
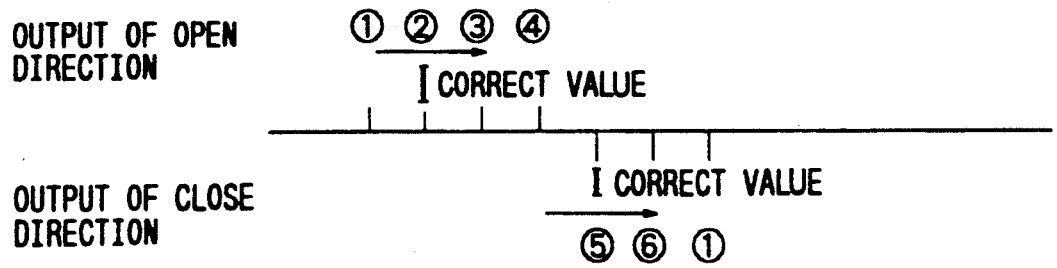
FIG. 5 is an explanatory diagram for a description of the operation of a throttle valve according to the invention.

FIG. 3 indicates the relationships between the internal pressures of the actuator 6 having the cable-layout hysteresis and the degrees of opening of the throttle. When the characteristic changes as indicated by (1) through (6) in FIG. 3, the throttle operates as shown in FIG. 4 in the case of the prior art in which the hysteresis correction is not made; whereas it operates as shown in FIG. 5 in the case of the embodiment in which the hysteresis correction is made.

As was described above, according to the invention, the cable-layout hysteresis of the actuator adapted to drive the engine throttle valve is corrected, and the vehicle speed is therefore improved in maintenance and in convergence, thus making it comfortable to ride in the vehicle. Furthermore, the device is simple in construction, and needs no throttle degree-of-opening sensor; that is, it is low in manufacturing cost. Furthermore, by subdividing the correction value according to the result of the counter, for instance by providing large, intermediate and small correction values, the vehicle speed can be controlled more suitably.

What is claimed is:

1. A vehicle constant-speed cruising device, comprising:
    travel speed measuring means for measuring a travel speed of a vehicle;
    target speed setting means for setting a target speed of said vehicle;
    speed difference calculating means for calculating a speed difference between said target speed and said travel speed;
    acceleration calculating means for calculating an acceleration of said vehicle in response to said travel speed signal;
    pulse width calculating means for calculating a pulse width of a pulse signal having a predetermined period in response to said speed difference and said acceleration;
    an actuator for operating an engine throttle valve in response to said pulse width thus calculated;
    output signal storing means for receiving an output from said pulse width calculating means, to store acceleration and deceleration signals output during a predetermined past period of time; and
    cable-layout hysteresis correcting means for receiving outputs of said pulse width calculating means and said output signal storing means, to subject the output of said pulse width calculating means to cable-layout hysteresis correction.

2. A vehicle constant-speed cruising device according to claim 1, wherein said cable-layout hysteresis correcting unit includes means for estimating a cable-layout hysteresis of said vehicle.

3. A vehicle constant-speed cruising device according to claim 1, wherein said pulse width calculating means calculates said pulse width based on a gain, said speed difference, and said acceleration.

4. A vehicle constant-speed cruising device according to claim 1, wherein said cable-layout hysteresis correcting unit includes means for comparing an output of said pulse width calculating means and an output from said output signal storing means.

5. A vehicle constant-speed cruising device according to claim 1, wherein said cable-layout hysteresis correcting unit includes means for monitoring output values of the acceleration and deceleration signals output during a predetermined past period of time and current pulses output by said pulse width calculating means.

6. A vehicle constant-speed cruising device according to claim 1, wherein said cable-layout hysteresis correcting unit includes means for determining whether cable-layout hysteresis is present.

7. A vehicle constant-speed cruising device, comprising:
    means for measuring a first speed of a vehicle;
    means for setting a second speed of said vehicle;
    a speed difference calculator which calculates a speed difference between said second speed and said first speed;
    an acceleration calculator which calculates an acceleration of said vehicle in response to said first speed signal;
    a pulse width calculator which calculates a pulse width of a pulse signal having a predetermined period in response to said speed difference and said acceleration;
    an actuator being operated in response to said pulse width thus calculated;
    means for receiving an output from said pulse width calculating means and storing first and second signals output during a predetermined first period of time; and
    means for receiving outputs of said pulse width calculating means and said output receiving and storing means, and for subjecting the output of said pulse width calculating means to cable-layout hysteresis correction.

* * * * *